INVENTOR
FRED L. SHELOR,
BY
ATTORNEY

United States Patent Office 3,279,353
Patented Oct. 18, 1966

3,279,353
DEEP-FAT PRESSURE-COOKER FRYERS
Fred L. Shelor, 109 Longstreet Ave., Highland Springs, Richmond, Va.
Filed July 8, 1964, Ser. No. 381,028
5 Claims. (Cl. 99—407)

This invention relates to improvements in deep-fat pressure-cooker fryers and is more particularly directed to an automatic basket-lifting means therefor.

In deep-fat pressure-cooker fryers such as have recently come into use, no provision is made for lifting the basket containing the product being deep-fat fried from the cooking oil prior to removal of the cover from the pressure vessel. This is a feature of disadvantage because during the interval required to release the pressure within the vessel, remove the cover therefrom and manually lift the basket from the cooking oil, the cooked product, usually fried chicken, tends to adsorb the cooking oil in which it is still immersed to a degree likely to impair, if not actually impairing, the flavor and appearance thereof.

Accordingly, it is a principal object of the present invention to provide, in a deep-fat pressure-cooker fryer, automatic means for lifting the basket containing the product being fried when it has been determinated that the cooking period has terminated and prior to release of pressure within the pressure vessel and removal of the cover therefrom.

More particularly, the present invention contemplates and aims to provide automatic basket lifting means for deep-fat pressure-cooker fryers, which is characterized by simple construction and design, and which is thoroughly practical and dependable in its operation.

Figure 1:
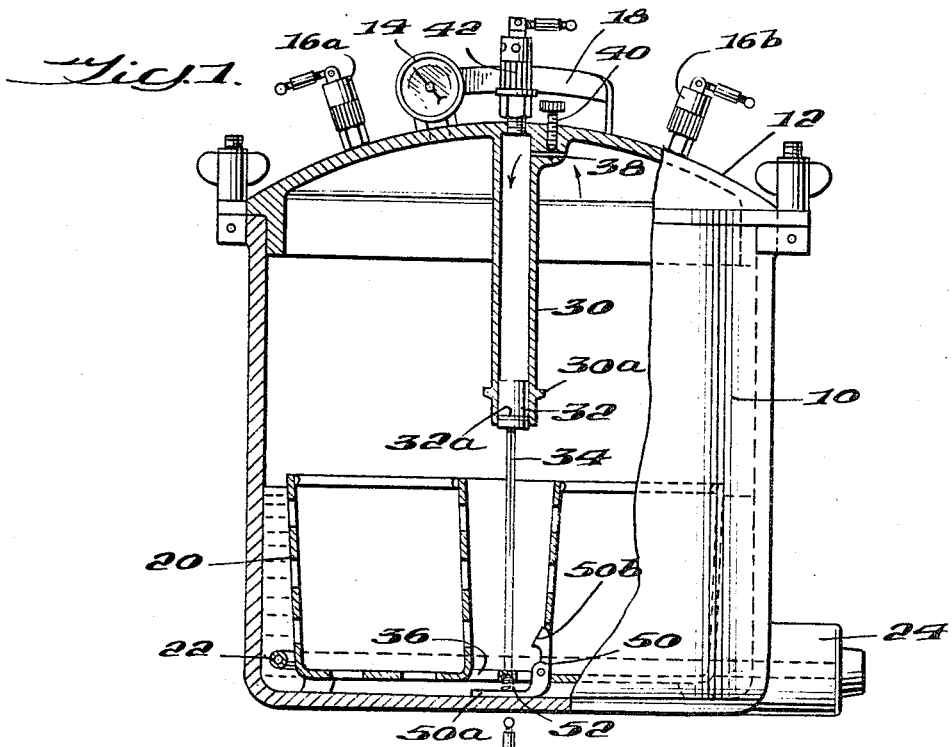
Figure 2:
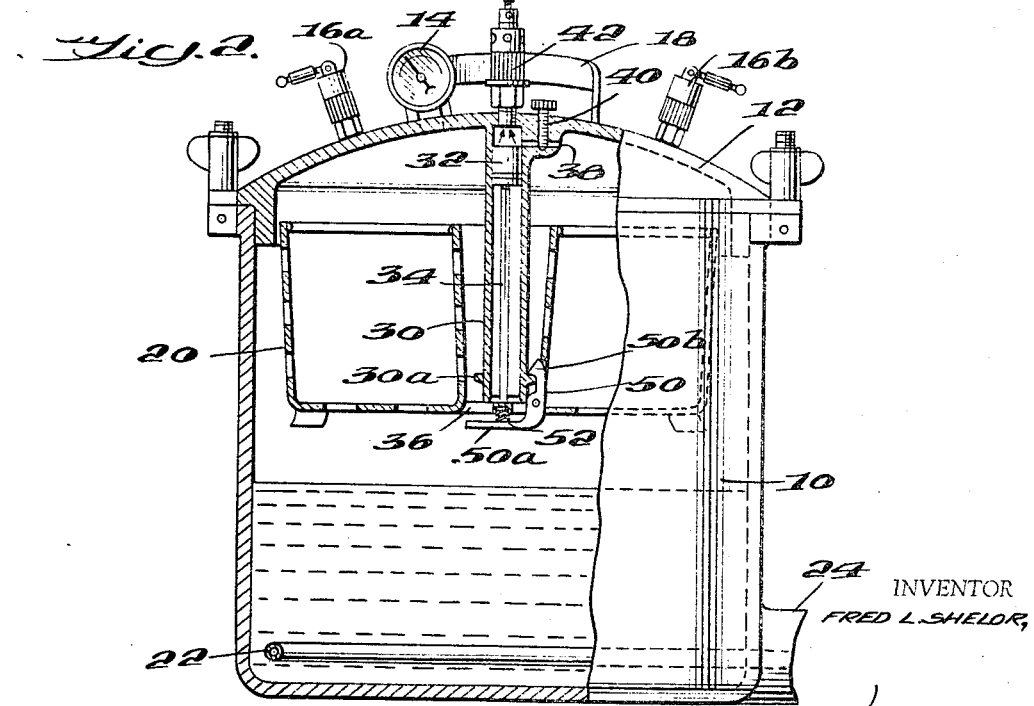

The above and other objects and advantages of automatic basket-lifting means for deep-fat pressure-cooked fryers according to the present invention will be set forth in or appear from the following detailed description, taken with the accompanying illustrative drawings, wherein:

FIG. 1 is a broken-away, part-sectional elevational view of a deep-fat pressure-cooker fryer incorporating the automatic basket-lifting means of the invention, in which the basket is shown in its normal low or cooking position; and FIG. 2 is a similar view but illustrating the food basket in its lifted position within the still closed pressure vessel to which it has been actuated according to the invention.

Referring to the drawings in greater detail, a deep-fat pressure-cooker fryer incorporating the automatic basket lifting means to which the present invention is more particularly directed comprises an open-top pressure vessel 10 and a cover 12 therefor provided with the usual cover-sealing and clamping means which are only generally shown since they are conventional and form no part of the present invention. Said cover 12 is shown to be provided with a gauge 14 and pressure release valves 16a, 16b and with handle means 18, which again are conventional.

Shown in its normal cooking position in which it rests on but is slightly raised from the bottom of the cooking vessel 10 by supporting feet provided thereon is a food-holding basket 20 shown to be of perforated wall, annular construction. The pressure vessel 10 is also shown as containing in its bottom portion a volume of cooking oil in which the basket 20 is immersed substantially to its upper edge so that said basket may be filled substantially to its top with food or products such as chicken parts which are to be deep-fried under pressure conditions developing within the closed vessel 10 when the oil is heated to cooking temperature. Preferably, the cooking oil is heated by a heating rod 22 immersed therein and which is disposed to encircle the lower portion of the basket, the heating rod being connected to an external source of electrical energy through plug-in means 24 generally indicated.

The aforesaid basket arrangement and the electrical means for heating the cooking oil are also conventional.

All prior deep-fat pressure-cooker fryers with which I am familiar are lacking in any means for lifting the basket and its food content from the cooking oil, without first releasing the steam pressure within the pressure vessel and then unclamping and removing the cover 12 therefrom. Such has proven to be an objectionable feature of the prior pressure-cooker fryers because of the tendency of the product being deep-fried, which of necessity remained immersed in the cooking oil during the interval required to release the pressure and remove the cover from the pressure vessel, to adsorb the cooking oil once the presssure within said vessel is relased, as results in both the flavor and appearance of the product contained within the basket being impaired.

To obviate this objection, the invention provides means for bodily lifting the basket 20 and of course its contents from the cooking oil when it has been determined that cooking of said contents has been completed and prior to release of pressure within the pressure vessel 10, with the desirable result as to make impossible the cooked product adsorbing the cooking oil consequent to change of pressure thereon while still immersed. Illustratively, and as will be described, such means is automatic in its operation, and comprises an elongated cylinder 30 depending axially downwardly from the under side of the cover 12 to which its upper end is rigidly affixed, and a piston 32 fitted to and reciprocable in said cylinder and which is carried at the upper end of an upright piston rod 34 affixed at its lower end to the basket 20, as by means of a fixedly carried spider 36 extending across the lower end of the vertically-disposed central opening of the basket as defined by its annular shape, whereby said rod extends axially upwardly through said central opening.

As best seen in FIG. 1, the respective axial lengths of the depending cylinder 30 and the upright piston rod 34 are such that, in the normal or cooking position of the basket 20, the piston 32 is substantially enclosed within the lower end of the cylinder which is shown to be fully open. By such arrangement, the pressure developing within the closed pressure vessel 10 as cooking proceeds is always effective and ready to act on the under face of said piston 32. On O-ring seal 32a carried by the piston so as to be operative against the inner cylindrical wall or bore of the cylinder 30 serves to prevent pressure leaking past the piston.

The pressure developing within the pressure vessel 10 is also normally effective on the upper face of the piston 32, consequent to the provision of a port 38 in the wall of the cylinder 30 near its upper end and which functions to establish communication between the pressure vessel interior space and the interior of the cylinder. Normally, said port is open, but it may be closed by means such as a thumb screw 40 which is threaded into and through the cover 12 in position to intersect said port and whose knurled or ribbed head is disposed externally of said cover so as to be freely accessible for turning from without said pressure vessel.

The cover 12 also mounts a pressure release valve 42 which is shown to be threadedly connected to said cover on the axis of the cylinder 30 and is thus operative to release the pressure within the upper end of the cylinder when such pressuure release is called for. Normally, said pressure release valve 42 is in the closed or cut-off position, so that the pressure within the cylinder 30 is that obtaining within the closed pressure vessel.

With the construction so far described, it will be seen that, consequent to the pressure obtaining within the closed pressure vessel 10 being normally communicated to the interior of the cylinder 30 through the aforesaid open port 38, the basket 20 maintains its lowered position in which it rests on the bottom of said pressure vessel, both by gravity and because of the lesser effective area of the under face of the piston 32 as compared to that of its upper face. However, when it is desired to lift the basket and its contents from the cooking oil without first releasing the pressure within the pressure vessel 10 and then removing the cover 12, thumb screw 40 is screwed down to close the port 38 and pressure release valve 42 is actuated to its open position, as results in loss of pressure within the upper end of the cylinder 30. Thereupon, the pressure obtaining within the closed vessel 10 becomes fully effective on the under face of the piston 32 and actuates the same upwardly, thereby lifting the basket 20 and its contents from the body of cooking oil contained in said pressure vessel.

According to a further feature of the invention, means are provided to releasably latch the basket 20 in the raised position to which it has been actuated as aforesaid. Illustratively, such means comprises a generally vertically extending latch member 50 disposed within the central opening of the basket adjacent the lower end thereof and being pivoted intermediate its ends to said basket inner-wall and spring-biased to a radially inward position within said opening as by a spring 52 reactive between the under face of the piston-rod mounting spider 36 and an offset extension 50a on the lower end of said latch member which serves as a latch-releasing finger piece. The upper end of said latch member is formed as a hook 50b which is adapted to ride over and thereupon latchably engage with a circular rib 30a integral with and projecting radially outwardly from the cylinder 30. The axial relation of latch member 50 and rib 30a is of course such that the latch means becomes operative when the basket 20 is lifted to a position such that its bottom line is disposed above the level of the cooking oil.

When it is desired to release the latching means, thereby to permit lowering of the basket 20 from its lifted to its normal low position, finger pressure from beneath is exerted on the offset finger piece 50a of the latch member, as results in disengagement of its upper hook-like end 50b from the aforesaid circular rib 30a, whereupon the basket will lower under its own weight and that of its contents, if any, into the cooking oil.

Without further analysis, it will be appreciated that automatic basket lifting means for a deep-fat pressure-cooker fryer as described and which operates in combination therewithin in the manner set forth satisfies the objects of the invention as previously explained in simple yet highly effective manner. However, as many changes could be made in carrying out the above constructions without departing from the scope of the invention, it is intended that all matter contained in the above description or shown in the accompanying drawings shall be interpreted as illustrative and not in a limiting sense.

I claim:

1. A deep-fat pressure-cooker fryer comprising, in combination, a pressure vessel adapted to contain a volume of cooking oil, a cover therefor, means operative between said cover and said vessel for sealing and clamping the cover to the vessel, a basket normally immersed in the cooking oil for holding the food to be deep-fried, and means operable prior to release of said pressure and removal of said cover for utilizing the pressure developing within the vessel during the cooking operation to lift the basket to a position above the level of the cooking oil.

2. A deep-fat pressure-cooker fryer comprising, in combination, a pressure vessel adapted to contain a volume of cooking oil, a cover therefor, means operative between said cover and said vessel for sealing and clamping the cover to the vessel, a basket normally immersed in the cooking oil for holding the food to be deep-fried, and complemental means carried by said cover and basket for lifting the basket to a position above the level of the cooking oil prior to release of the pressure developing within said closed and sealed pressure vessel during the cooking operation, said complemental means including a cylinder carried by the cover and depending downwardly therefrom into the interior of the pressure vessel, a piston reciprocable in said cylinder and being affixed to and extending upwardly from said basket, and manually operable means for directing pressure developing within the pressure vessel during the cooking operation against that face of the piston as causes its movement within the cylinder in direction and by an amount as to lift the basket above the level of the cooking oil.

3. A deep-fat pressure-cooker fryer according to claim 2, wherein coacting latching means serving to latch the basket in its raised position are provided on said basket and cylinder, respectively.

4. A deep-fat pressure-cooker fryer according to claim 2, wherein the lower end of the cylinder is open whereby the pressure within the pressure vessel is effective on the under face of the piston, wherein the upper end of the cylinder is normally closed to atmosphere and is in open communication with the vessel interior through normally open port means, whereby the pressure within the pressure vessel is normally effective on the upper face of the piston, and wherein said manually operable means is effective to open the upper end of the cylinder to atmosphere and to close off said port means thereby to subject the under face of the piston operating within the cylinder to the pressure within the pressure vessel.

5. A deep-fat pressure-cooker fryer according to claim 4, wherein said basket carries latch means for releasably securing itself in raised position when lifted thereto as aforesaid.

References Cited by the Examiner

UNITED STATES PATENTS

| 1,692,144 | 11/1928 | Thielicke | 99—410 X |
| 1,753,740 | 4/1930 | Chapin et al. | 99—334 |
| 2,626,560 | 1/1953 | Burkhardt | 99—410 X |

FOREIGN PATENTS

| 738,932 | 10/1932 | France. |
| 509,740 | 7/1939 | Great Britain. |

WALTER A. SCHEEL, *Primary Examiner.*

BILLY J. WILHITE, *Examiner.*